United States Patent
Schaller

(10) Patent No.: US 12,044,958 B2
(45) Date of Patent: Jul. 23, 2024

(54) CAMERA SHUTTER DEVICE WITH PERMANENT MAGNETS

(71) Applicant: JENOPTIK Optical Systems GmbH, Jena (DE)

(72) Inventor: Uwe Schaller, Kahla (DE)

(73) Assignee: JENOPTIK Optical Systems GmbH, Jena (DE)

( * ) Notice: Subject to any disclaimer, the term of this patent is extended or adjusted under 35 U.S.C. 154(b) by 58 days.

(21) Appl. No.: 17/995,650

(22) PCT Filed: Apr. 14, 2021

(86) PCT No.: PCT/DE2021/100343
§ 371 (c)(1),
(2) Date: Oct. 6, 2022

(87) PCT Pub. No.: WO2021/213586
PCT Pub. Date: Oct. 28, 2021

(65) Prior Publication Data
US 2023/0161228 A1  May 25, 2023
US 2024/0201566 A2  Jun. 20, 2024

(30) Foreign Application Priority Data
Apr. 22, 2020 (DE) .................. 10 2020 110 977.6

(51) Int. Cl.
*G03B 9/36* (2021.01)

(52) U.S. Cl.
CPC .................... *G03B 9/36* (2013.01)

(58) Field of Classification Search
CPC ....................................... G03B 9/36
See application file for complete search history.

(56) References Cited

U.S. PATENT DOCUMENTS

| | | | |
|---|---|---|---|
| 8,322,935 B2 | 12/2012 | Viglione | |
| 8,333,521 B2 | 12/2012 | Viglione | |
| 11,294,260 B2* | 4/2022 | Park | G06F 1/1686 |
| 2014/0369675 A1* | 12/2014 | Takahashi | G02B 26/02 |
| | | | 396/469 |
| 2017/0371152 A1 | 12/2017 | Stephenson | |
| 2020/0249415 A1* | 8/2020 | Wang | G03B 5/00 |
| 2021/0200062 A1* | 7/2021 | Abe | G06F 1/1656 |

FOREIGN PATENT DOCUMENTS

| | | |
|---|---|---|
| CN | 202748581 U | 2/2013 |
| DE | 11 2009 000 564 T5 | 12/2010 |
| DE | 11 2011 101 137 T5 | 1/2013 |
| JP | 2004-309672 A | 11/2004 |
| KR | 10-2009-0035139 A | 4/2009 |
| KR | 10-2010-0127041 A | 12/2010 |

* cited by examiner

*Primary Examiner* — Clayton E. LaBalle
*Assistant Examiner* — Diana Hancock
(74) *Attorney, Agent, or Firm* — Christensen, Fonder, Dardi & Herbert PLLC

(57) ABSTRACT

A camera shutter device having a shutter blade which moves abruptly between a first position, in which it covers a transmission zone present between the carriers, and a second position, in which it opens up the transmission zone. On the shutter blade, there is provided a slide body which includes a displaceable permanent magnet and which is guided on a linear guide, the ends of which are assigned a respective rotatable permanent magnet. By oppositely changing the polarization direction of the rotatable permanent magnets through 180°, the displaceable permanent magnet is pulled into the first or second position.

9 Claims, 5 Drawing Sheets

CAMERA SHUTTER DEVICE WITH PERMANENT MAGNETS

PRIORITY CLAIM

The present application is a National Phase entry of PCT Application No. PCT/DE2021/100343, filed Apr. 14, 2021, which claims priority from German Patent Application No. 10 2020 110 977.6, filed Apr. 22, 2020, the disclosures of which are hereby incorporated by reference herein in their entirety.

FIELD OF THE INVENTION

The invention relates to a shutter device for a camera module (e.g., an IR camera module), particularly for use in various types of photographic, thermal imaging, laboratory, and calibration equipment, said shutter device using static electromagnetic forces for opening and closing.

BACKGROUND OF THE INVENTION

DE 11 2009 000 564 T5 discloses a shutter device, in particular for photographic and laboratory equipment, consisting of at least one shutter blade, a permanent magnet movably connected to the at least one shutter blade, and an electromagnet which defines a gap between two poles and can be switched into two states. In the first state, the at least one shutter blade is pulled into the gap and in the second state, the at least one shutter blade is pushed out of the gap. The at least one shutter blade is pivotably, rotatably or otherwise movably connected to a base plate. The base plate defines a shutter opening through which light can pass. Light is selectively prevented from passing through by placing the shutter blade, driven by the movement of the permanent magnet between the poles of the electromagnet, over the shutter opening.

DE 11 2011 101 137 T5 discloses a shutter device, particularly for photographic and laboratory equipment, comprising a base having a stop and a central aperture, a permanent magnet rotatably mounted on the base, and a shutter blade mounted on the magnet and configured to move between an open position and a closed position, one aperture at a time being exposed or blocked and the magnet contacting the stop in the open and closed positions. The surfaces of the magnet may be located at or between the working ends of a solenoid and cooperate with the solenoid to actuate the shutter blade. In this process, poles are formed by applying a current to a cylindrical coil, by which poles the permanent magnet is attracted or repelled and thus drives the shutter blade or a pin until it hits the stop or otherwise makes contact. The polarity of the cylindrical coil can be changed as desired by a driver to clear or block the aperture.

In another embodiment example, the permanent magnet is a rotating permanent magnet in communication with a base, with the rotation of the magnet being limited.

In another embodiment example, the permanent magnet is rotatably mounted to a pin extending substantially perpendicular to the base.

It is a disadvantage of the two above-disclosed shutter devices that the shutter blade is held against the stop in the open or closed position solely by the electromagnet.

CN 202 748 581 U discloses a shutter device for a camera module with a frame, two shutter blades, permanent magnets, springs, two linear sliding structures, electromagnets and a light transmission zone. The two shutter blades each have two sliding cylinders via which they are guided between two positions on the two linear sliding structures arranged parallel to each other, which are designed here as guide cylinders. The sliding cylinders on the shutter blades are permanent magnets. An electromagnet is arranged centrally on each of the guide cylinders. Depending on its polarization, it attracts or repels the sliding cylinders, which are designed as permanent magnets, against the spring forces of the compression springs arranged around the guide cylinders. In the de-energized state, the shutter blades are applied to the frame in a first position in which the shutter blades clear the light transmission zone, with the frame acting as a stop. In the second position, the shutter blades close the light transmission zone, while overlapping slightly. The sliding cylinders contact the electromagnet under the effect of the magnetic force.

US 2017/0371152 A1 discloses an optical shutter with a bistable actuator, a compact design and a number of components reduced to a minimum. An electromagnet is mounted on a base plate, with a cylindrical coil and an armature that can move within it and to which a shutter blade is attached. The shutter blade slides between the base plate and a cover plate covering the base plate, between two end positions determined by the stroke of the armature, there being two equal openings in the base plate and the cover plate, one above the other, which are either closed or opened.

A particular disadvantage of the shutter device disclosed therein is that when the electromagnet is de-energized, the shutter blades are held in the first position only by the spring force. Mechanical vibrations or oscillations of the device can cause the shutter blades to lift off the frame and possibly vibrate with the springs.

SUMMARY OF THE INVENTION

It is the object of the invention to create a shutter device with two positions for a shutter, in which the shutter is held in a force-fitting, stable manner in the de-energized state of the device.

This object is achieved by a camera shutter device comprising a frame having two supports arranged opposite each other, a linear sliding structure terminating at the supports, and a shutter which, guided by the action of magnetic forces along the linear sliding structure in a sliding direction with alternating directional sense, jumps between a first position, in which it covers a transmission zone present between the supports, and a second position, in which it clears the transmission zone. The shutter contains one shutter blade or two shutter blades.

It is essential to the invention that exactly one sliding body is fixedly arranged on the shutter blade in each case, which sliding body is formed by a permanent magnet (referred to below as a displaceable permanent magnet for the purpose of differentiation) or contains a displaceable permanent magnet and is guided on a linear guide of the linear sliding structure in each case. A rotatable permanent magnet is assigned to each end of the one or two linear guides and is firmly connected to a driven shaft of a rotary drive. It is mandatory that the driven shaft is not aligned parallel to the sliding direction. In the best case, it is aligned at a right angle to the sliding direction. The polarization direction of the rotating permanent magnet includes a right angle with the driven shaft.

For certain applications, it is advantageous if the shutter contains exactly one shutter blade.

If the shutter is designed with two shutter blades, it is advantageous if the extension of the device resulting from the doubling of the shutter blades is a mirror-image design of the device according to the design with only one shutter blade.

It is advantageous if the rotatable permanent magnet is connected to the driven shaft indirectly via a magnet holder and the magnet holder has a slot extending radially to the driven shaft, in which slot a rotation stop fixed with respect to the support engages, whereby the rotary movement of the rotary drive is limited to 180°.

BRIEF DESCRIPTION OF THE DRAWINGS

The invention will be explained in more detail below with reference to embodiment examples and drawings. In the drawings.

DETAILED DESCRIPTION OF THE DRAWINGS

Figure 1A:
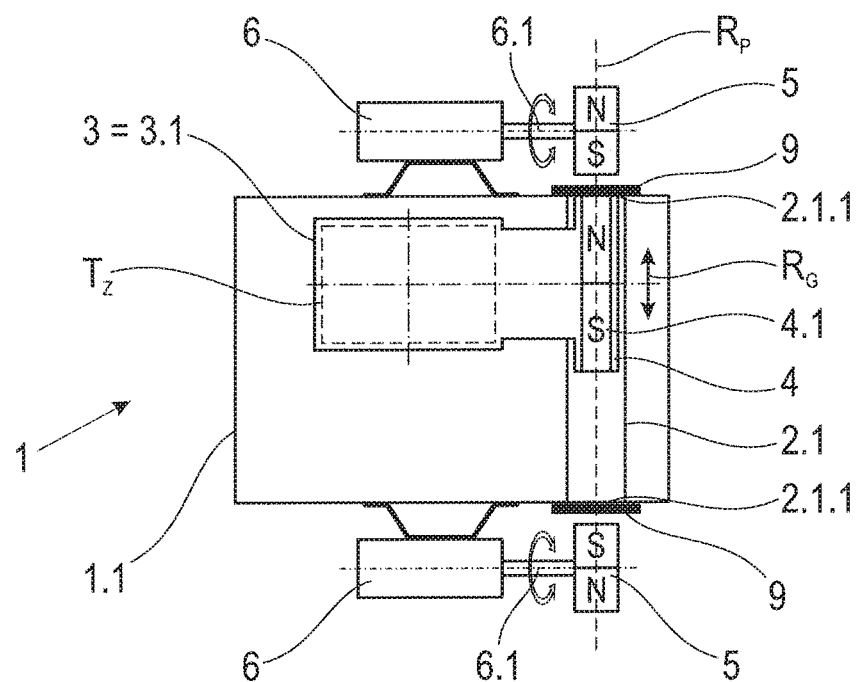
FIG. 1a is a schematic diagram of a shutter device with a shutter blade in a first position covering the transmission zone.

A shutter device according to the invention includes a frame 1 that has two supports 1.1 arranged opposite each other. Between the two supports 1.1 there is a linear sliding structure 2 ending at each of the supports 1.1, and a shutter 3 which, guided by the action of magnetic forces along the linear sliding structure 2 in a sliding direction RG with alternating directional sense, jumps between a first position, in which it covers a transmission zone TZ present between the supports, and a second position, in which it clears the transmission zone TZ.

The linear sliding structure is formed by exactly one linear guide 2.1 when the shutter 3 has only one shutter blade 3.1 and is formed by two linear guides 2.1 arranged parallel to each other when the shutter 3 has two shutter blades 3.1. The frame 1, the linear sliding structure 2 and the shutter 3 are made of a non-magnetic and non-magnetizable material.

Figure 1B:
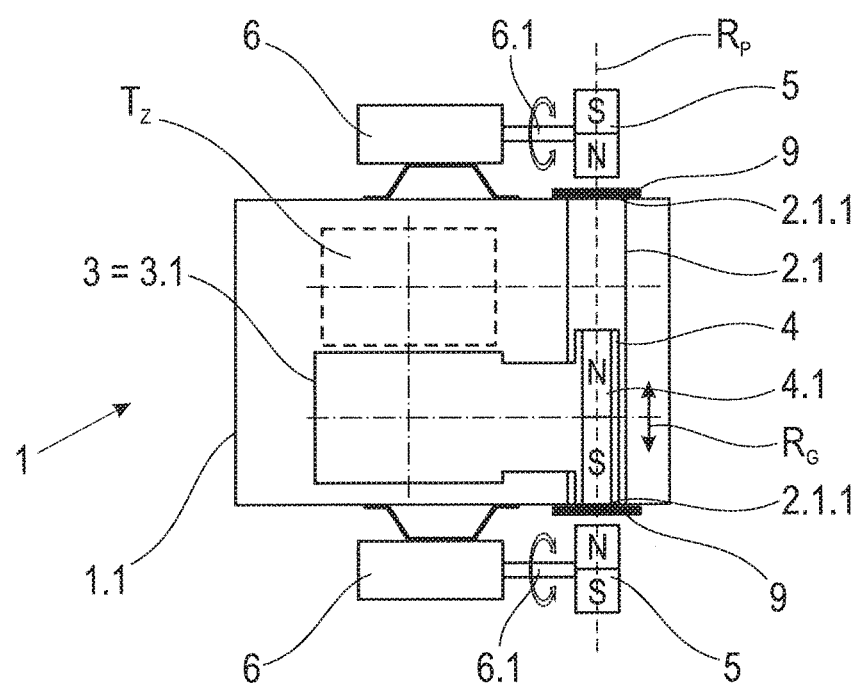
FIG. 1b is a schematic diagram of a shutter device with a shutter blade in a second position clearing the transmission zone.

According to a first general embodiment of a shutter device, not shown to scale as a schematic diagram in FIGS. 1a and 1b, the shutter 3 contains exactly one shutter blade 3.1.

The shutter blade 3.1 is dimensioned slightly larger than the transmission zone TZ so that it completely covers the transmission zone TZ, see FIG. 1b, in its first position even if the components of the device have rough manufacturing and assembly tolerances. A sliding body 4 is provided on the shutter blade 3.1, which is guided on the linear guide 2.1. The sliding body is either formed by a displaceable permanent magnet 4.1 or contains a displaceable permanent magnet 4.1. The polarization direction of the displaceable permanent magnet 4.1 is in the sliding direction.

A rotatable permanent magnet 5 is assigned to each of the two ends 2.1.1 of the linear guide 2.1. The rotatable permanent magnets 5 are firmly connected, in each case preferably indirectly via a magnet holder 7 (not shown in FIG. 1a and FIG. 1b), to a driven shaft 6.1 of a rotary drive 6. The driven shafts 6.1 of the two rotary drives 6 are preferably aligned at a right angle to the sliding direction RG, and the polarization directions RP of the rotatable permanent magnets 5 each include a right angle with the respective output axes connected to them. Deviations from the preferred perpendicular alignment of the driven shafts 6.1 to the sliding direction RG result in lower efficiency.

To operate the device, the two rotary drives 6 are driven synchronously or preferably slightly offset in time, so that the two rotatable permanent magnets 5 are each rotated by 180° at the same time or slightly offset in time, alternating between their two positions. Preferably, the direction of rotation of the rotary drives 6 is changed for this purpose and the rotation takes place in each case against a rotation stop 8 (not shown in FIGS. 1a, 1b) by 180°.

If the rotary drive 6, whose associated rotatable permanent magnet 5 is currently holding the displaceable permanent magnet 4.1, is driven somewhat later, the attracting force acting on the displaceable permanent magnet 4.1 is built up more quickly, and the rotary drive 6, whose associated rotatable permanent magnet 5 is currently holding the displaceable permanent magnet 4.1, must counteract a lower holding force.

In the two positions, the two rotatable permanent magnets 5 are aligned with their polarization directions opposing each other in the sliding direction. The displaceable permanent magnet 4.1 is thus attracted by one of the two rotatable permanent magnets 5 in each case, while at the same time it is repelled by the other of the two rotatable permanent magnets 5. A direct rotation stop 8 of the displaceable permanent magnet 4.1 against the rotatable permanent magnets 5 is avoided by the presence of non-magnetizable baffle plates 9 on each of the supports 1.1; said baffle plates 9 cover the end of the linear guide 2.1 and do not influence the magnetic field located between one of the rotatable permanent magnets 5 and the displaceable permanent magnet 4.1 in each case. In this way, the shutter blade 3.1 is held securely in its two positions even when the device is in a de-energized state.

A design of the device with only one shutter blade 3.1 is particularly advantageous for the use of the shutter device for an offset adjustment in a (particularly thermal) IR camera (NUC, non-uniformity correction), in which it is important that the shutter, which closes the light transmission zone for a short time for at least one image acquisition cycle, has a temperature on its surface that is as exactly uniform as possible. In the case of a two-part shutter, where the two shutter blades inevitably have a different relative position to existing heat sources or heat sinks within the device, a resulting temperature difference between the shutter blades can already mean that the shutter is not well usable for offset adjustment.

Nevertheless, a design with two shutter blades 3.1 can also be advantageous for other applications.

Figure 2A:
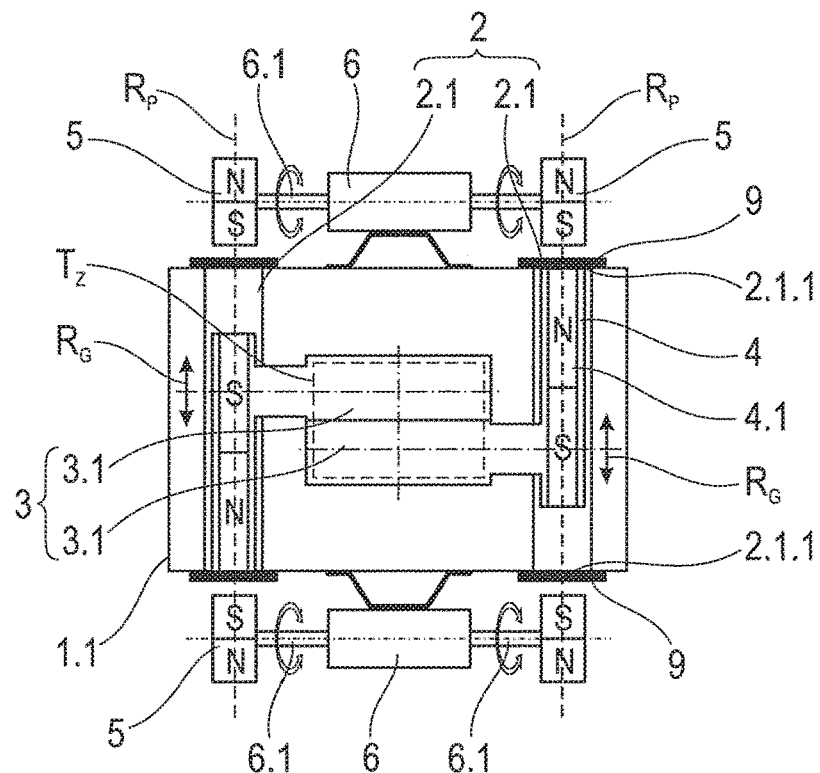
FIG. 2a is a schematic diagram of a shutter device with two shutter blades in a first position covering the transmission zone.
Figure 2B:
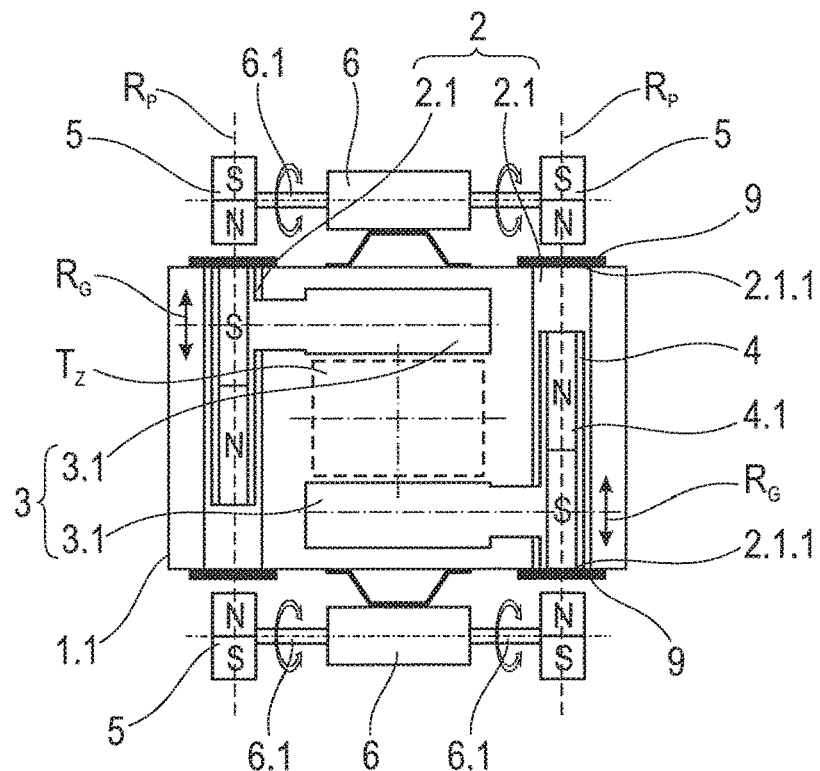
FIG. 2b is a schematic diagram of a shutter device with two shutter blades in a second position clearing the transmission zone.

In FIGS. 2a and 2b, a second general embodiment of a shutter device is shown as a schematic diagram, in which the shutter 3 contains two shutter blades 3.1. The two shutter blades 3.1 are each associated with a linear guide 2.1 and two rotatable permanent magnets 5 corresponding to the first embodiment of a device. The rotatable permanent magnets 5 assigned here respectively to the ends 2.1.1 on one of the supports 1.1 can each be arranged on a driven shaft 6.1 of a same rotary drive 6 or another rotary drive 6 (not shown here), as illustrated. Advantageously, the extension of the device resulting from the doubling of the shutter blades 3.1 is a mirror-image design of the device according to the design with only one shutter blade 3.1.

Advantageous detailed embodiments for the general embodiments shown are described below. They can be combined with each other and all serve the goal of a constructively simple design of the device without having to make high demands on manufacturing and assembly tolerances.

FIGS. 3*a* to 3*d* show four advantageous embodiments for the rotatable permanent magnet 5 and its indirect connection to the driven shaft 6.1. In all four embodiments, the rotatable permanent magnet 5 is attached to a magnet holder 7 (non-magnetic), which has a slot 7.1 introduced radially to the driven shaft 6.1, in which the rotation stop 8, fixed with respect to the support 1.1, engages. FIG. 3*e* shows a section through the magnet holder in a plane lying in the slot 7.1. The magnet holder thus strikes the rotation stop 8 in two rotational positions, rotated 180° to each other. In these two rotational positions, the polarization direction RP is aligned with the sliding direction GP. Only these two rotary positions can be set as stable angular positions with the device.

Figure 3A:
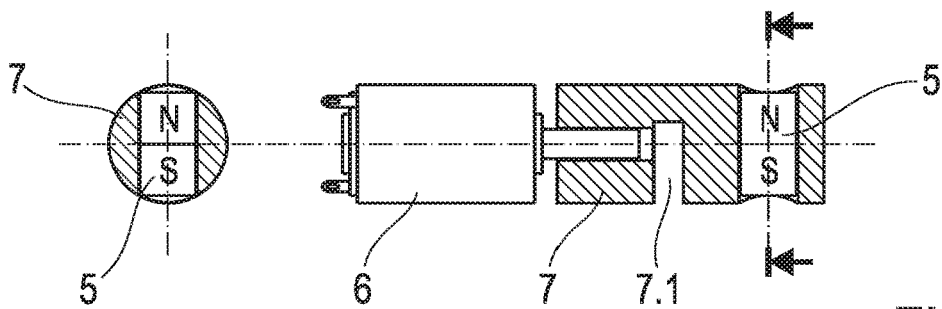
FIGS. 3a-3d show various embodiment examples of the rotatable permanent magnet and its indirect connection to the driven shaft.
Figure 3B:
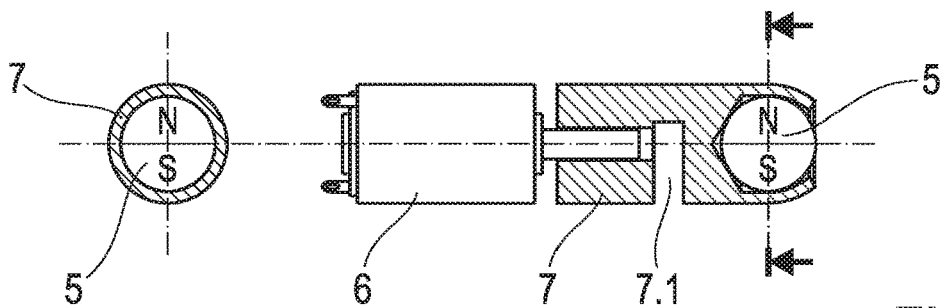
Figure 3C:
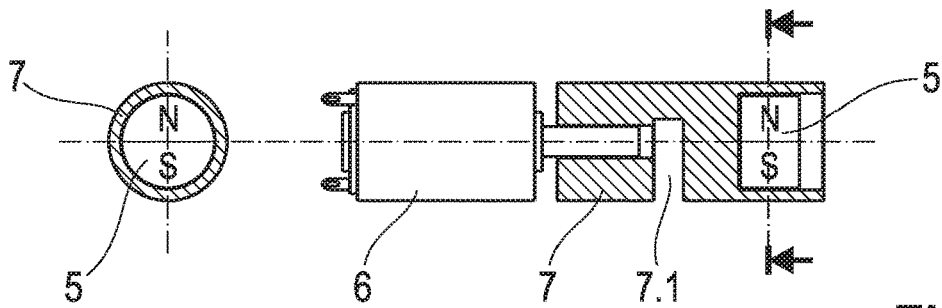
Figure 3D:
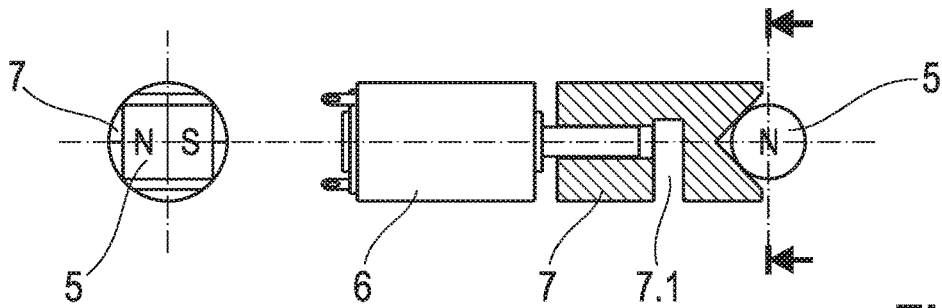
Figure 3E:
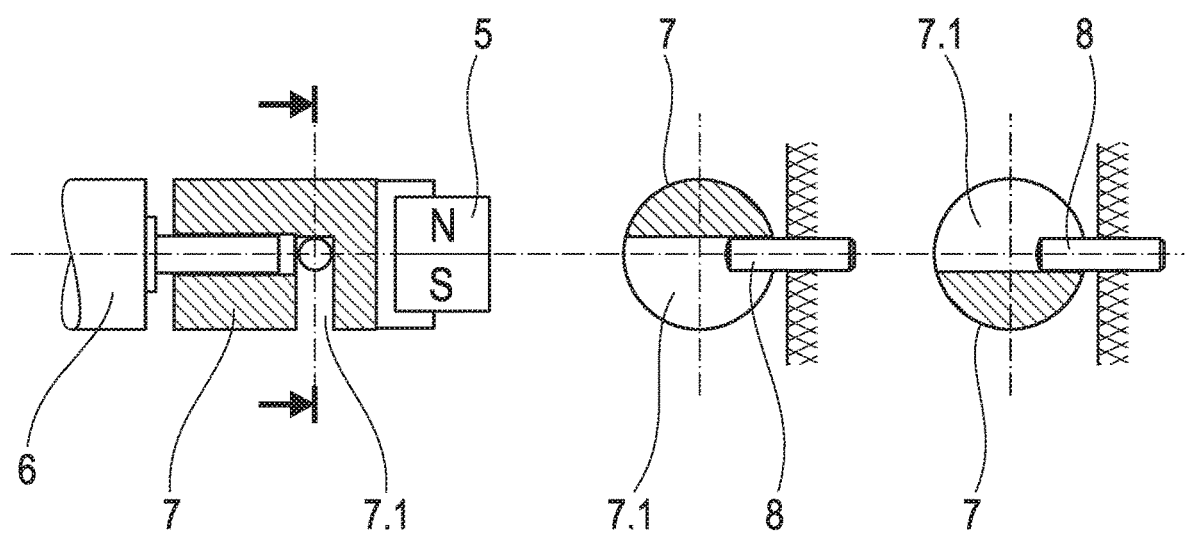
FIG. 3e shows an arrangement of the rotation stop in the slot of the magnet holder.

In the embodiment example shown in FIG. 3*a*, the rotatable permanent magnet 5 is a bar magnet that is fixed radially to the driven shaft 6.1 in the magnet holder 7. According to the embodiment example in FIG. 3*b*, the permanent magnet is a spherical magnet, and according to FIG. 3*c*, it is a disc magnet. The polarization direction RP lies in each case in a radial plane to the driven shaft 6.1. FIG. 3*d* shows a particularly advantageous design in which a bar magnet is glued into a V-groove formed on the magnet holder. For better representation, the rotatable permanent magnet is located in an unstable intermediate layer.

Figure 4A:
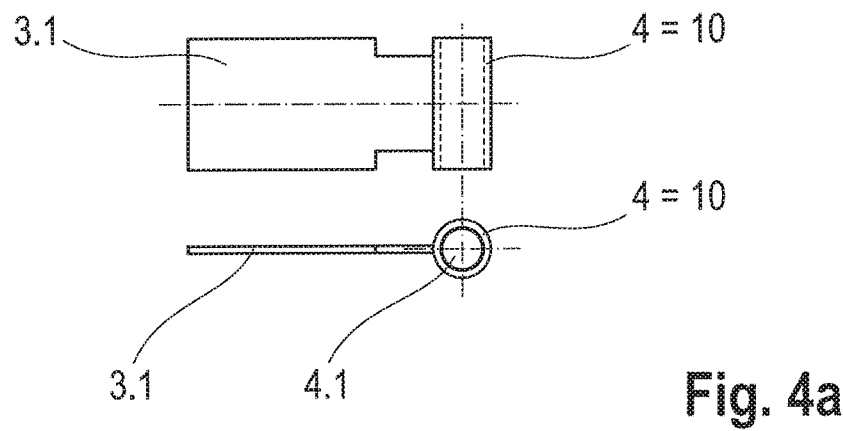
FIGS. 4a-4c show various embodiment examples of the design and connection of the sliding body to the shutter blade.
Figure 4B:
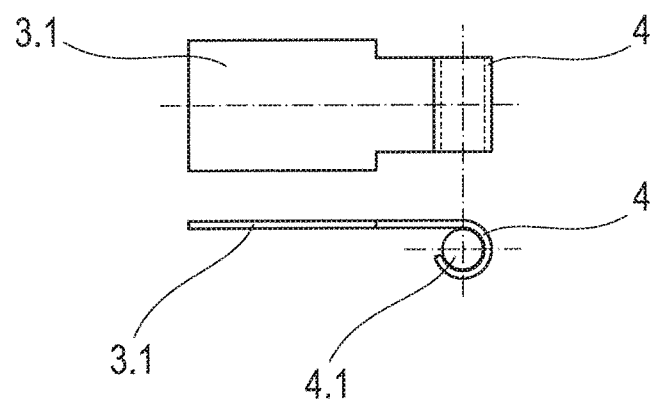
Figure 4C:
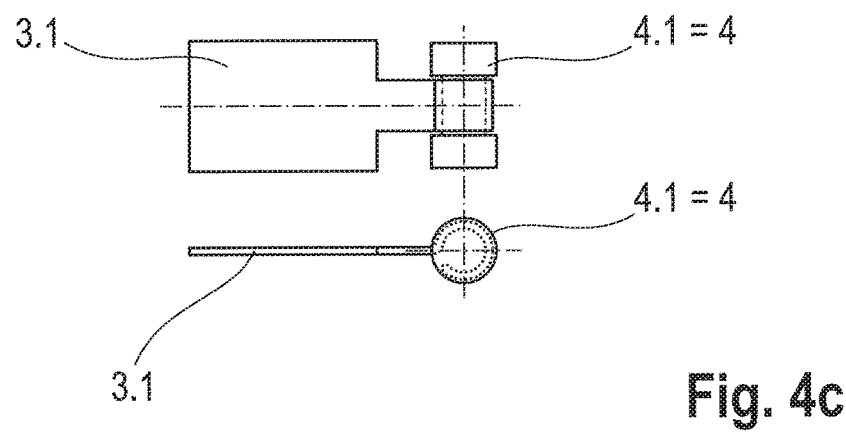

FIGS. 4*a* to 4*c* show three advantageous embodiment examples for the design and connection of the sliding body 4 to the shutter blade 3.1. In all embodiment examples, the displaceable permanent magnet 4.1 is a bar magnet. In the embodiment example according to FIG. 4*a*, it is fitted in a sleeve forming the sliding body 4, which is attached, in a materially bonded manner, to an arm formed on the shutter blade 3.1. The embodiment example shown in FIG. 4*b* is easier to produce. Here the shutter blade 3.1 is bent around the displaceable permanent magnet 4.1 without a taper forming an arm, so that the shutter blade 3.1 surrounds the displaceable permanent magnet 4.1 by more than 180°. The sliding body 4 is formed here by a part of the shutter blade 3.1. In the embodiment example shown in FIG. 4*c*, the displaceable permanent magnet 4.1 itself forms the sliding body. The sliding body is provided with an annular groove in the center, in which an arm formed on the shutter blade 3.1 wraps around the sliding body. The linear guide 2.1 has a round or trapezoidal cross-section matching these embodiment examples.

As an alternative to the above-mentioned embodiment examples, the displaceable permanent magnet designed as a bar magnet can have a central bore along its axis and the linear guide 2.1 is designed as a bar on which the displaceable permanent magnet can slide when fitted thereon (not shown in the drawings).

LIST OF REFERENCE NUMERALS 1 frame
1.1 support
2 linear sliding structure
2.1 linear guide
2.1.1 ends of the linear guide
3 shutter
3.1 shutter blade
4 sliding body
4.1 displaceable permanent magnet
5 rotatable permanent magnet
6 rotary drive
6.1 driven shaft
7 magnet holder
7.1 slot
8 rotation stop
9 baffle plate
RG sliding direction
RP polarization direction
TZ transmission zone

The invention claimed is:

1. A camera shutter device, comprising:
a frame having two supports arranged opposite each other,
a linear sliding structure terminating at the supports, and
a shutter which, guided by action of magnetic forces along the linear sliding structure in a sliding direction with alternating directional sense, jumps between a first position, in which it covers a transmission zone present between the supports, and a second position, in which it clears the transmission zone,
wherein:
the shutter includes a shutter blade and a sliding body being fixedly arranged on the shutter blade, the sliding body being formed by a displaceable permanent magnet or containing a displaceable permanent magnet and being guided on a linear guide of the linear sliding structure, the linear guide having a first end and a second end, the first end adjacent to a first rotatable permanent magnet, the second end adjacent to a second rotatable permanent magnet, the first rotatable permanent magnet connected to a first driven shaft of a first rotary drive, which first driven shaft is not aligned parallel to the sliding direction, the second rotatable permanent magnet connected to a second driven shaft of a second rotary drive, which second driven shaft is not aligned parallel to the sliding direction, wherein a polarization direction of the first rotatable permanent magnet forms a right angle with the first driven shaft, and a polarization direction of the second rotatable permanent magnet forms a right angle with the second driven shaft.

2. The camera shutter device according to claim 1, wherein the first and second driven shafts are each aligned at a right angle to the sliding direction.

3. The camera shutter device according to claim 1, wherein the shutter contains exactly one shutter blade.

4. The camera shutter device according to claim 1, wherein the first rotatable permanent magnet is connected to the first driven shaft indirectly via a first magnet holder, the second rotatable permanent magnet is connected to the second driven shaft indirectly via a second magnet holder, the first magnet holder has a first slot extending radially to the first driven shaft, in which first slot a first rotation stop fixed with respect to one of the two supports engages, and the second magnet holder has a second slot extending radially to the second driven shaft, in which second slot a second rotation stop fixed with respect to another of the two supports engages.

5. A camera shutter device, comprising:
a frame having two supports arranged opposite each other, a linear sliding structure terminating at the supports, and a shutter which, guided by the action of magnetic forces along the linear sliding structure, jumps between a first position, in which it covers a transmission zone present between the supports, and a second position, in which it clears the transmission zone, wherein the shutter includes:

a first shutter blade and a first sliding body being fixedly arranged on the first shutter blade, the first sliding body being formed by a displaceable permanent magnet or containing a displaceable permanent magnet and guided on a first linear guide of the linear sliding structure; and a second shutter blade and a second sliding body being fixedly arranged on the second shutter blade, the second sliding body being formed by a displaceable permanent magnet or containing a displaceable permanent magnet and guided on a second linear guide of the linear sliding structure;

wherein:

the first linear guide has a first end and a second end, the first end of the first linear guide being adjacent to a first rotatable permanent magnet, the second end of the first linear guide being adjacent to a second rotatable permanent magnet, the first rotatable permanent magnet connected to a first driven shaft of a first rotary drive, the second rotatable permanent magnet connected to a second driven shaft of a second rotary drive, the first and second driven shafts not aligned parallel to a sliding direction of the first shutter blade, wherein a polarization direction of the first rotatable permanent magnet forms a right angle with the first driven shaft, and a polarization direction of the second rotatable permanent magnet forms a right angle with the second driven shaft; and the second linear guide has a first end and a second end, the first end of the second linear guide being adjacent to a third rotatable permanent magnet, the second end of the second linear guide being adjacent to a fourth rotatable permanent magnet, the third rotatable permanent magnet connected to the first driven shaft of the first rotary drive, the fourth rotatable permanent magnet connected to the second driven shaft of the second rotary drive, the first and second driven shafts not aligned parallel to a sliding direction of the second shutter blade, wherein a polarization direction of the third rotatable permanent magnet forms a right angle with the first driven shaft, and a polarization direction of the fourth rotatable permanent magnet forms a right angle with the second driven shaft.

6. The camera shutter device according to claim 5, wherein the first driven shaft is aligned at a right angle to the sliding direction of the first shutter blade and the second driven shaft is aligned at a right angle to the sliding direction of the second shutter blade.

7. The camera shutter device according to claim 5, wherein the shutter contains exactly two shutter blades.

8. The camera shutter device according to claim 5, wherein the first shutter blade with the fixedly-arranged first sliding body forms a mirror-image of the second shutter blade with the fixedly-arranged second sliding body.

9. The camera shutter device according to claim 5, wherein:

each of the first and third rotatable permanent magnets are respectively connected to the first driven shaft indirectly via first and third magnet holders, each of the first and third magnet holders having a slot extending radially to the first driven shaft, in which slot a rotation stop fixed with respect to one of the two supports engages; and each of the second and fourth rotatable permanent magnets is respectively connected to the second driven shaft indirectly via second and fourth magnet holders, and each of the second and fourth magnet holders has a slot extending radially to the second driven shaft, in which slot a rotation stop fixed with respect to another of the two supports engages.

* * * * *